United States Patent
Benco et al.

(10) Patent No.: US 8,175,582 B2
(45) Date of Patent: May 8, 2012

(54) SYSTEM AND METHODS FOR DELIVERING EVENT-RELATED MULTIMEDIA CONTENT TO WIRELESS DEVICES

(75) Inventors: David S. Benco, Winfield, IL (US);
Kevin J. Overend, Elmhurst, IL (US);
Baoling S. Sheen, Naperville, IL (US);
Sandra Lynn True, St. Charles, IL (US);
Kenneth J. Voight, Sugar Grove, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 11/591,945

(22) Filed: Nov. 2, 2006

(65) Prior Publication Data
US 2008/0106600 A1   May 8, 2008

(51) Int. Cl.
*H04M 3/42* (2006.01)
*H04M 1/00* (2006.01)
*H04B 7/00* (2006.01)
*H04N 7/18* (2006.01)
*H04N 7/16* (2011.01)
*A61B 1/04* (2006.01)
*G06F 15/16* (2006.01)

(52) U.S. Cl. .............. 455/414.1; 455/556.1; 455/517; 348/157; 348/74; 709/206; 709/228; 725/62; 725/14; 725/81

(58) Field of Classification Search .............. 455/414.1, 455/517; 348/157, E7.085
See application file for complete search history.

(56) References Cited

U.S. PATENT DOCUMENTS

| | | | |
|---|---|---|---|
| 7,210,160 B2* | 4/2007 | Anderson et al. | 725/81 |
| 7,248,888 B2* | 7/2007 | Inselberg | 455/517 |
| 2003/0032409 A1* | 2/2003 | Hutcheson et al. | 455/414 |
| 2005/0210512 A1* | 9/2005 | Anderson et al. | 725/62 |
| 2005/0278731 A1* | 12/2005 | Cameron et al. | 725/14 |
| 2007/0019069 A1* | 1/2007 | Arseneau et al. | 348/74 |
| 2007/0021058 A1* | 1/2007 | Arseneau et al. | 455/3.06 |
| 2007/0058041 A1* | 3/2007 | Arseneau et al. | 348/157 |
| 2007/0088838 A1* | 4/2007 | Levkovitz et al. | 709/228 |
| 2007/0100942 A1* | 5/2007 | Lin et al. | 709/206 |

* cited by examiner

*Primary Examiner* — Dwayne Bost
*Assistant Examiner* — Timothy Pham
(74) *Attorney, Agent, or Firm* — Carmen Patti Law Group, LLC

(57) ABSTRACT

A system for delivering to a wireless subscriber terminal multimedia content related to a spectator event comprises an event application server, a wireless network coupled to the event application server and a wireless subscriber terminal that interacts with the network. The event application server acquires, converts, and manages content related to a spectator event. The event application server (or its adjunct) also manages preferences and priorities established by subscribers for event-related content. When such content is available, the event application server reconciles available content with subscriber preferences and priorities to determine an optimal set of content to be delivered to the subscriber terminal, and requests that the wireless network establish a connection to the subscriber terminal for such content. Multiple streams of content, of various types of media, may be delivered simultaneously to the subscriber terminal.

16 Claims, 6 Drawing Sheets

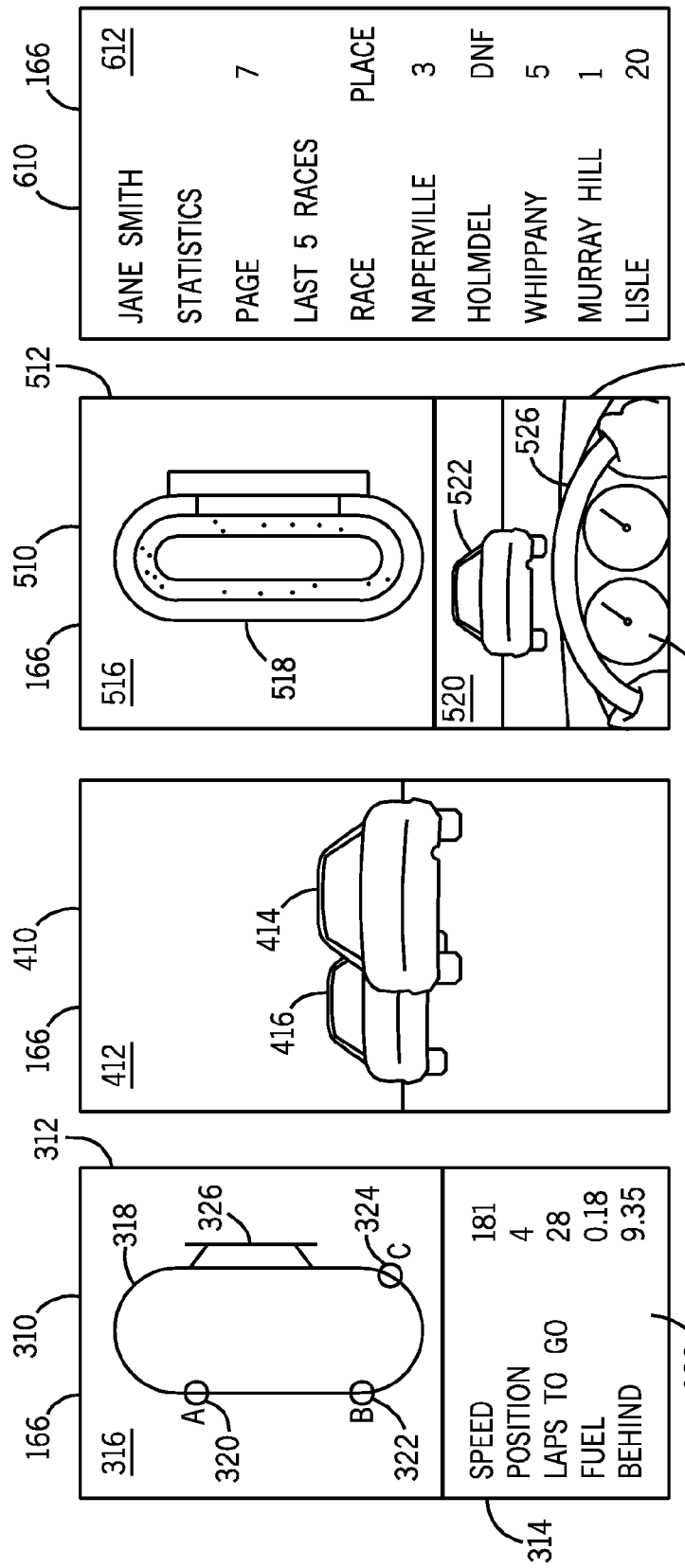

SYSTEM AND METHODS FOR DELIVERING EVENT-RELATED MULTIMEDIA CONTENT TO WIRELESS DEVICES

TECHNICAL FIELD

This invention relates generally to telecommunications systems, and more particularly to wireless telecommunications networks adapted to deliver to a wireless subscriber terminal multimedia information relating to an activity or event.

BACKGROUND

Sporting events and other large events attract many avid spectators hungry for timely, detailed information about the progress of the event. Some events are sufficiently compact, and the significant activities are sufficiently localized, that all spectators can have an essentially complete view of any interesting happenings.

Other events, however, have sizes or complexities that make it difficult for the spectators to continuously directly observe all of the "action" in which they may be interested. An automobile race is often a good example of such an event. Much spectator interest is, of course, directed to the leading vehicle and driver. Because the race cars move so quickly, the leading vehicle will be near any particular spectator for only a brief period during each lap. Depending on the size and geometry of the track, factors such as structures, spectator seating facilities, topography, and distance can prevent a spectator from clearly viewing the leading vehicle during a substantial fraction of the lap.

Interesting activity may occur in places other than the vicinity of the leading vehicle. Some of these locations may be out of the spectator's field of view. For example, a driver passing another, a passing attempt rebuffed by skillful action of another driver, a vehicle entering or leaving the pit lane, a vehicle being serviced in the pits, and a collision, are all events in which a spectator may be keenly interested but which she or he may not have an opportunity to observe directly. Several such events can occur simultaneously, so although a spectator may be able to observe nearby action, the spectator may be unaware of action occurring elsewhere. Further, simultaneous interesting events may occur in bursts separated by periods of little interesting activity, such that when action occurs, the spectator necessarily misses some of it.

In addition to direct visual observation, spectators are keenly interested in factual and statistical data concerning the event, and in other modalities of observation that might be available. For example, spectators generally want to know the relative positions of the various vehicles/drivers. Accordingly, race tracks conventionally provide a scoreboard that displays the position of the leading vehicles or all vehicles. Other events have similar displays. A disadvantage of a scoreboard, leader board, or the like, is that there is a limited amount of visible area on the scoreboard, so not all of the information in which spectators are interested can be displayed. A further disadvantage is that at large events, many spectators may have obstructed views of the scoreboard.

Spectators are also interested in eavesdropping on communications between drivers and their pit crews, which are typically conducted via radio. Accordingly, some spectators have used known radio receivers for such eavesdropping, and at least one company has marketed to race enthusiasts a scanner-type radio receiver which was preprogrammed with frequencies typically used for such communications. A disadvantage of using a scanner-type radio is that such devices are relatively bulky and expensive, and the spectator may have no other use for such a device. In addition, it is believed that some race teams have adopted digital radio technologies, and perhaps encryption technologies, to avoid such eavesdropping and limit distribution of driver-to-pit-crew communications to authorized media outlets.

Race spectators are also known to use conventional portable television and radio receivers to receive broadcast media coverage of races. Television broadcasters are known to distribute a variety of live, near-real-time, and recorded content, including: video images of the race in overview and close-up; video images from cameras mounted in vehicles; still images derived from video; graphical images showing aspects of the race track or the race in schematic form or enhancing camera-derived images or video to improve understanding; factual and statistical data concerning the race, race series, drivers, and teams; driver-to-crew audio; commentary; and the like. Radio broadcasters are known to distribute a subset of this content appropriate for an audio-only distribution medium.

Although many of these broadcast services may be useful to the spectator, they present several disadvantages. First, broadcast media, by their nature, attempt to appeal to the broadest cross-section of consumers. Automobile racing enthusiasts are known for their loyalty to favorite drivers. Many fans would be interested in consuming all possible content concerning their favorite drivers or teams, regardless of whether such drivers or teams are in the lead. Broadcast services tend to focus on the leading driver and perhaps on drivers who have captured the attention of the general public, but not necessarily on the drivers or teams in whom any particular spectator is interested. Broadcast services also tend to furnish a variety of different content during a race, which may include live video, audio, graphics, interviews, and commentary, but many consumers are likely to be dissatisfied with the broadcaster-selected mix of content, at certain times, or all the time. Some spectators might prefer to view in-car-camera video all the time, while others might prefer to view activities in the pit area, while others may prefer statistical information, while still others would prefer a topical mix of content regarding their favorite driver.

Further, broadcast content is generally designed to be viewed on a larger display, such as a normal-sized television, and some content, particularly graphical or text content, cannot be satisfactorily viewed on the display of a small portable television receiver of the type that would be conveniently carried by a spectator to a race. Of course, some devices, such as radio, do not provide a display for broadcast content at all.

A number of commercially-available portable wireless devices, including wireless "telephone" handsets designed to work in cellular- and PCS-type wireless networks, and a variety of small personal productivity devices with the capability of accessing wireless networks, are now equipped to display content of a number of media types, including video, audio, text, and graphics. Known wireless networks have the capability of delivering content of at least these types to portable wireless devices.

Known wireless networks have so far been arranged to deliver either a near-real-time stream of content obtained from a conventional broadcast media source, or, upon subsequent user request, various content recorded from a conventional broadcast media source. A spectator could, theoretically, attempt to use a portable wireless device to access conventional broadcast media coverage of an event. Although a portable wireless device may be more convenient than a portable television for a spectator to carry, the spectator would still experience the aforementioned disadvantages of receiving content from a conventional broadcast media source.

Although the disadvantages of known information and content delivery systems heretofore have been discussed in the environment of an automobile race, spectators at a variety of other events of significant size or complexity could experience like disadvantages. For example, these disadvantages would likewise be experienced by spectators of other sporting events, such as the Olympic games, and of other activities, such as the launch of a space vehicle, political conventions and other large meetings, festivals of music, arts, or other entertainment, and the like.

Thus, a need exists for a system to acquire content related to a spectator event, in various media types, and to deliver a consumer-selected set of such content to a portable wireless device equipped for accessing wireless telecommunications networks.

SUMMARY

An event-related multi-media content delivery system includes an event application server, a wireless network coupled to the event application server and a wireless subscriber terminal that interacts with the network.

The event application server acquires, converts, and manages content related to a spectator event. The event application server includes subsystems for acquiring and digitizing video and audio media content, for converting such content into streams, and for receiving and processing event-related factual data and statistical data relating to the event and its participants. The event application server also includes a control and data management component, and may incorporate a subscriber database and a subscription management system which manages preferences and priorities established by subscribers for event-related content.

When event-related content is available, the control and data management component reconciles available content with subscriber preferences and priorities to determine an optimal set of content to be delivered to the subscriber terminal. The control and data management component requests that the wireless network establish connections to the subscriber terminal for such content, and then delivers the optimal set of content via these established connections. Multiple streams of content, of various types of media, may be delivered simultaneously to the subscriber terminal.

From time to time, content of various media types and from various sources will newly become available or unavailable, and subscribers may arrive on or depart from the wireless network. In each such case, the control and data management component reconciles the preferences and priorities of each affected subscriber, again determines a set of content that optimally matches the preferences of the subscriber, and initiates or terminates a corresponding connection to the subscriber terminal, and respectively delivers or ceases delivery of the related content.

DESCRIPTION OF THE DRAWINGS

Features of example implementations of the invention will become apparent from the description, the claims, and the accompanying drawings in which:

FIG. 3 is a diagram showing the display 166 of the subscriber terminal 120 of FIG. 1, depicting a first example 310 of how the subscriber terminal may render content delivered by the system 100;

FIG. 4 is a diagram showing the display 166 of the subscriber terminal 120 of FIG. 1, depicting a second example 410 of how the subscriber terminal may render content delivered by the system 100;

FIG. 5 is a diagram showing the display 166 of the subscriber terminal 120 of FIG. 1, depicting a third example 510 of how the subscriber terminal may render content delivered by the system 100;

FIG. 6 is a diagram showing the display 166 of the subscriber terminal 120 of FIG. 1, depicting a fourth example 610 of how the subscriber terminal may render content delivered by the system 100;

DETAILED DESCRIPTION

Figure 1:
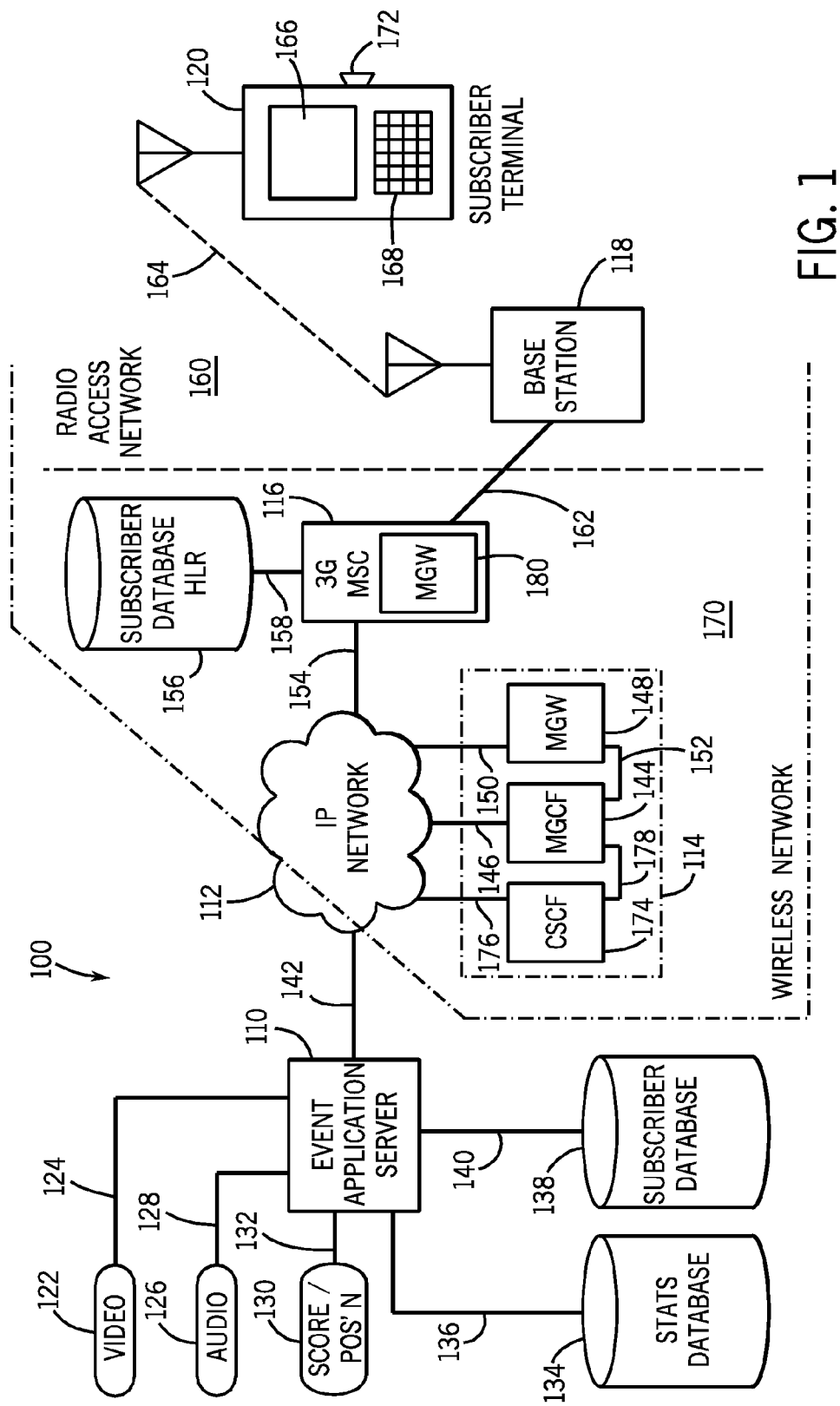
FIG. 1 is a block diagram of an exemplary embodiment of a system 100 for acquiring content of various media types concerning a spectator event and delivering such content via a wireless telecommunications network to a subscriber terminal 120.

FIG. 1 is a block diagram of an exemplary embodiment of a system 100 constructed according to an aspect of the present invention for acquiring content of various media types concerning a spectator event and delivering such content via a wireless telecommunications network to a subscriber terminal.

The present application relates to telecommunications systems, including multimedia telecommunications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

Also, the present application is described herein in an exemplary embodiment in which the spectator event is an automobile race. However, the system could be applied to numerous other environments, including other spectator events in which content is generated in a variety of media, which content spectators may wish to receive on a portable wireless device.

As best seen in FIG. 1, the event-related media delivery system 100 preferably comprises an event application server (EAS) 110 coupled to a wireless wide-area telecommunications network 170, which, in turn, is in communication with a compatible wireless subscriber terminal 120. In overview, EAS 110 acquires event-related content of various media types relating to a spectator event. EAS 110 manages this content, and responsive to user subscription requests, EAS 110 replicates the content, prepares it for transmission via wireless network 170, and forwards it to wireless network 170 for delivery to wireless subscriber terminal 120. Wireless subscriber terminal 120 may be any appropriate portable device capable of accessing wireless network 170 and displaying or playing the types of media desired by subscribers.

Although the functions and structure of EAS 110 are discussed in greater detail in connection with FIG. 2, EAS 110 is discussed here at an overview level to aid the reader in understanding the operation of the event-related media delivery system 100.

EAS 110 is preferably equipped to receive event-related content of a variety of media types which subscribers may wish to receive on wireless subscriber terminal 120. For example, EAS 110 is preferably equipped to receive video content from video content sources 122 over video signal path 124, and to receive audio content from audio content sources 126 via audio signal path 128.

EAS 110 preferably receives scoring and position information from score/position content source 130 via score/position signal path 132. Examples of scoring/position content may include the ordinal position of cars, the location of cars, the speed of the cars, fuel supply, lap number, and other information of interest to spectators. EAS 110 is also preferably coupled to an external statistics database 134 via statistics database link 136 to obtain statistics content. Examples of statistics content may include aggregated information regarding rankings, standings, or prior performance of drivers, cars, teams, the track, the race series, the race organization, and the like. EAS 110 is also preferably coupled to a subscriber database 138 via an appropriate data link 140. The subscriber database 138 may store, for example, the identity of subscribers to the event-related multimedia delivery service, along with particular information identifying the particular events for which the subscription is active, and a variety of user-specific feature choices and parameters relating thereto.

EAS 110 is preferably coupled to wireless network 170 via an appropriate data link 142. As best seen in FIG. 1, link 142 may be an Internet protocol (IP) link and the connection to wireless network 170 may be via an IP network 112, which may employ any appropriate topology, and employ any appropriate allocation of elements among public and private networks and network operators. For example, portions of IP network 112 may be implemented as part of wireless network 170, while other portions of IP network 112 may be external to the wireless network 170. One of skill in the art will appreciate that the term "wireless" in "wireless network" refers to that portion of the network which provides a radio link between the network and subscriber terminals, and that the network may incorporate links, including back-haul facilities, constructed using a variety of technologies, including wired links and optical fiber links of various types, microwave links, free-space optical links, and the like. Although link 142 is depicted as an IP link, this link, and other IP links hereinafter mentioned unless otherwise specified, may be encapsulated in or carried over data paths employing other protocols as is known in the art.

Wireless network 170 may be implemented using any suitable wireless network technology that provides capability to transport data of a variety of media types at relatively high data rates to a subscriber terminal. Although several wireless network technologies are available which could be used to implement an embodiment of the present invention, wireless networks that are based on GSM standards with a GPRS overlay, or based on the 3GPP or 3GPP2 standards, are believed to be particularly suitable because such networks have facilities to support transmission of multimedia data to subscriber terminals at acceptable rates. Preferably, wireless network 170 is implemented as a "3rd-Generation" or 3G wireless network. Examples of networks of this type are those defined in specifications of the 3rd Generation Partnership Project (3GPP), a collaboration of standards bodies. 3GPP may be contacted at the following address: 3rd Generation Partnership Project, ETSI, Mobile Competence Centre, 650, route des Lucioles, 06921 Sophia-Antipolis Cedex, FRANCE. Specifications that may be relevant to a suitable 3G wireless network include, but are not limited to: 3GPP TS 23.228 IP Multimedia Subsystem (IMS); 3GPP TS 23.228 IP Multimedia Subsystem (IMS); 3GPP TS 29.332: Media Gateway Control Function (MGCF)—IM Media Gateway (IM-MGW) Mc interface; 3GPP TS 29.232: Media Gateway Controller (MGC)—Media Gateway (MGW) interface; 3GPP TS 32.225 Charging Data Description for IMS, Release 5; 3GPP TS 32.260 (V2.0.0, 2004-12): Telecommunication management; Charging management; IP Multimedia Subsystem (IMS) charging; (Release 6); and 3GPP2 X.S0013-007 (Version 1.0, 2003-12): IP Multimedia Subsystem, Charging Architecture. Specifications of other standards bodies may also be relevant, including but not limited to: Telecommunications Industry Association IS-835-A: Wireless IP Network Standard. Other specifications and standards may also be relevant. Suitable 3G wireless networks are commercially available. For example, a set of wireless network infrastructure products implementing a suitable 3G wireless network is commercially available from Lucent Technologies, 600 Mountain Ave., Murray Hill, N.J., using components of Lucent and of its commercial partners. A suitable wireless network may include without limitation the following Lucent products: the Lucent Network Gateway (LNG), which performs the Media Gateway Function in the IMS Network; the Lucent Session Manager, which implements the CSCF and BGCF functions; the Lucent Media Resource Server (LMRS), which provides the MRFP and MRFC functions in the IMS Network; the Lucent Feature Server 5000, which provides service logic in an IMS network for basic and advanced call processing services, and the AnyPath Messaging System which provides unified messaging for subscribers. One of skill in the art will appreciate that other components, in addition to those listed, would be required to implement a suitable 3G network. It is believed that 3G networks are also commercially available from other vendors.

Commercially available wireless networks of the type which may be used to implement an embodiment of the present invention are quite intricate. Wireless network 170 is therefore presented in FIG. 1 in simplified form, depicting those elements which are particularly relevant to the invention or the depiction of which is believed to aid in understanding without adding unnecessary complexity. One of skill in the art will appreciate that, in order to function, commercially available networks may require a number of elements not shown in FIG. 1.

As best seen in FIG. 1, wireless network 170 preferably comprises a Mobile Switching Center (MSC) 116, an IP Multimedia Subsystem and a radio access network 160. MSC 116 is coupled to IMS 114 and other network components via a link 154. As best seen in FIG. 1, link 154 may be an Internet protocol (IP) link and the connection to EAS 110 and other network components may be via IP network 112. In general, IP network 112 may act as a thoroughfare allowing all connected components to communicate.

MSC 116 provides a number of services for voice calls, and in addition, manages the resources of the radio access network for all traffic between subscriber terminals such as 120 and the rest of the wireless network 170. MSC 116 also provides billing and accounting functions, and may provide subscriber and feature authentication and authorization functions. MSC 116 preferably includes a Media Gateway (MGW) 180. Media gateways enable multimedia communications between networks which may not necessarily employ identical protocols for transporting and processing bearer traffic, signaling, and other traffic. Such protocols include, but are not limited to Internet Protocol (IP) and Asynchronous Transfer Mode (ATM). In each network, both bearer and control information may comply with one or more protocols at various levels, and data in one protocol may be encapsulated in another protocol, as is known in the art. MGW 180, inter alia, provides translation services between telecommunications networks, such as radio access network 160 and IP network 112. The Media Gateway Control Function for MGW 180 is provided as part of MSC 116. When communicating over a network, a MGW such as 180 generally communicates with a counterpart MGW such as 148.

MSC 116 is preferably coupled to an MSC subscriber database 156 via a link 158. MSC subscriber database 156 may be implemented using any appropriate database technology, and may be implemented using distributed network resources, using apparatus and methods known in the art. MSC subscriber database 156 could be implemented as a home location register (HLR), or a portion thereof. Although EAS subscriber database 138 and MSC subscriber database 156 are shown as discrete elements, these elements could be implemented using a single network-accessible database facility. Whether these elements could be usefully combined may depend on whether the EAS 110 and the wireless network 170 are operated by the same or closely cooperating entities. In certain cases, including but not limited to those where the EAS 110 and the wireless network 170 are operated by different entities, the subscriber may be required to obtain two subscriptions—a first subscription defined in EAS subscriber database 138 that controls the application services provided by EAS 110, and a second subscription defined in MSC subscriber database 156 that controls the features, including the availability of high-speed data transport, provided by wireless network 170 to wireless subscriber terminal 120.

Radio access network 160 provides means by which the wireless network 170 communicates with subscriber terminals, such as wireless subscriber terminal 120. The radio access network 160 includes at least one base station 118 which implements a wireless (radio) link, such as link 164, to the subscriber terminal. Base station 118 is connected to MSC 116 via MSC-to-base-station link 162. Although FIG. 1 depicts only a single wireless subscriber terminal 120 and a single base station 118, in practical implementations there will be many subscriber terminals present in the network, and the radio access network 160 will typically comprise a sizable number of base stations to provide wireless access coverage over a wide geographical area.

IP Multimedia Subsystem (IMS) 114 provides an interface between wireless network 170 and external packet networks. For this purpose, traffic originating in EAS 110 may be considered to originate on an external packet network. The IP Multimedia Subsystem is defined in specifications of the 3rd Generation Partnership Project (3GPP), including but not limited to 3GPP TS 23.228 IP Multimedia Subsystem (IMS). Other specifications of 3GPP and other standards organizations may also be relevant. A suitable IP Multimedia System is commercially available from Lucent Technologies, 600 Mountain Ave., Murray Hill, N.J., using components produced by Lucent and by its commercial partners. It is believed that suitable IMS products are available from other vendors.

The IP Multimedia System is intricate. IMS 114 is therefore presented in FIG. 1 in simplified form, depicting those elements which are particularly relevant to the invention or the depiction of which is believed to aid in understanding without adding unnecessary complexity. One of skill in the art will appreciate that, in order to function, commercially implementations of IMS may require a number of elements not shown in FIG. 1. IMS 114 preferably comprises a media gateway (MGW) 148 and a media gateway control function (MGCF) 144 and a call session control function (CSCF) 174. MGCF 144 is coupled to IP network 112 via MGCF-to-IP-network link 146 and to MGW 148 via MGCF-to-MGW link 152. MGW 148 is coupled to IP network 112 via MGW-to-IP-network link 150. CSCF 174 is coupled to the IP network 112 via CSCF-to-IP-network link 176, and to the MGCF via CSCF-to-MGCF link 178.

The MGW 148 translates bearer content between the encoding and transmission formats used in the external packet network and those used in wireless network 170. For example, for an audio stream, the MGW 148 may perform a vocoding function to translate between the format generated in the EAS 110 and that required by the wireless subscriber terminal 120. The MGW 148 may provide a similar conversion for video streams. When communicating over a network, a MGW such as 148 generally communicates with a counterpart MGW such as 180. The MGCF 144 controls the MGW 148 and provides the control interface to external networks. The CSCF 174 functions as the contact point by which EAS 110 and other IMS application servers to access the IMS network.

Wireless subscriber terminal 120 may be any suitable portable wireless device that is capable of displaying the content generated by EAS 110 and desired by the subscriber. Wireless subscriber terminal 120 preferably comprises at least a display 166, a user input device 168, which may be a keyboard, and a sound output device 172. Suitable candidate devices include, but are not limited to, wireless telephone handsets and wide-area-network-enabled personal digital assistants. Many such devices have color displays capable of displaying video and still images in one or more formats, web browsers capable of displaying text, still images, and video images in various arrangements, and audio reproduction hardware capable of presenting audio at quality acceptable to users. Many portable wireless devices also have the ability to execute programs written in a commonly-used programming language, such as Java.

The wireless subscriber terminal 120 may employ a standard web browser to view subscription service content. Alternatively, the wireless subscriber terminal 120 may be furnished with an application program that receives via wireless network 170 display instructions from EAS 110, which instructions define how subscription content is to be displayed. The application program may be delivered to the wireless subscriber terminal 120 via wireless network 170.

Figure 2:
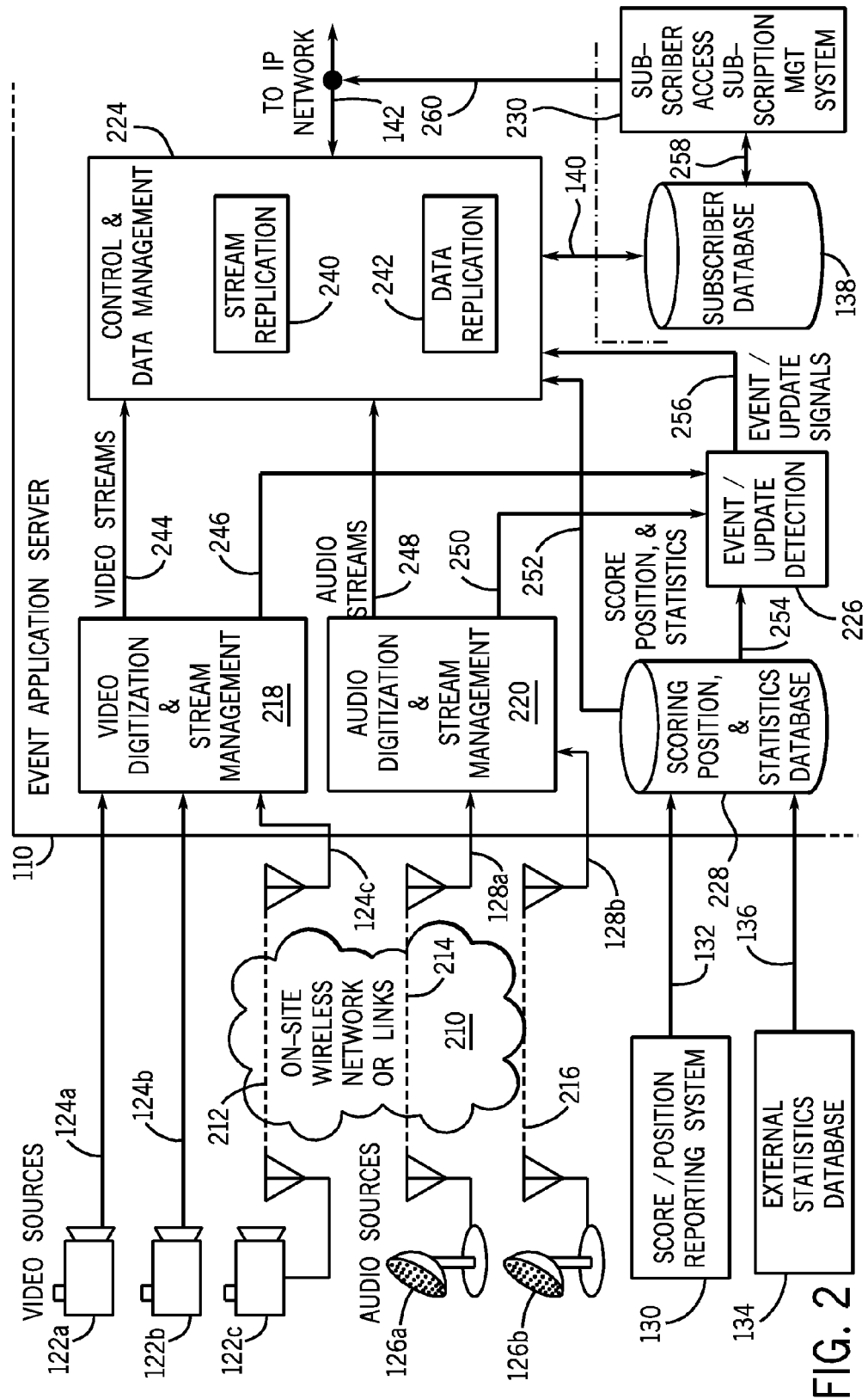
FIG. 2 is a block diagram of an event application server 110 component of the exemplary system 100 of FIG. 1, showing in greater detail the event application server 110 and cooperative content acquisition and subscription management components.

FIG. 2 is a block diagram showing in greater detail the event application server 110 and cooperative content acquisition and subscription management components. As best seen in FIG. 2, EAS 110 comprises a video digitization and stream management subsystem 218, an audio digitization and stream management subsystem 220, a control and data management subsystem 224, an event/update detection subsystem 226 and a scoring/position/statistics database 228. Although the components of EAS 110 are shown as discrete elements, many of these components may also be implemented as part of one or more general-purpose computer systems, programmed in any suitable computer programming language, and coupled to suitable peripheral subsystems. Processing multimedia content, in particular streams of audio and video content, requires significant amounts of computing resources. Although EAS 110 is referred to as a "server", the functions of EAS 110 may be distributed over multiple physical computer systems, servers or server clusters to achieve the needed performance. Additional digitization and stream management components may be provided to accommodate media of types other than video and audio.

Video digitization and stream management subsystem 218 receives items of media content (in this case, video content) from video content sources such as 122a, 122b and 122c via links 124a, 124b and 124c respectively. Video content sources 122a, 122b, and 122c are depicted as cameras, but could be any source of video content with which video digitization and stream management subsystem 218 is compatible. For example, video sources could be conventional fixed cameras, in-car cameras, video signals from broadcast media, or the like, and may be in NTSC, PAL, NA-HDTV or other suitable formats. Moreover, although three video content sources are shown, any number of video content sources could be used, subject to the processing capacity of EAS 110. Video content originating in mobile sources, such as in-car cameras, may be transported to video digitization and stream management subsystem 218 via an on-site wireless network 210 or via a point-to-point wireless link such as 212.

Video digitization and stream management subsystem 218 digitizes and encodes the video content, as required, into an appropriate stream format which can be accepted by MGW 148 (FIG. 1). Video digitization and stream management subsystem 218 may be implemented using conventional general-purpose computers, with commercially-available video capture interface cards, and programmed in any suitable computer programming language. Some video capture cards provide on-board MPEG-4 encoding, and it may be advantageous to use such cards because this feature reduces demand for general purpose processor capacity. Video digitization and stream management subsystem 218 furnishes the digitized and encoded video streams to control and data management subsystem 224 over video stream pathways 244 for further processing. Some video signals may arrive already digitized and/or encoded, in which case video digitization and stream management subsystem 218 may either transcode the digitized video into a different format, or, if the signal is already supplied in a format usable by MGW 148, it may furnish the signal unchanged to control and data management subsystem 224.

Video digitization and stream management subsystem 218 also furnishes information about the state of each video stream to event/update detection subsystem 226 via video stream state information link 246. This stream state information allows event/update detection subsystem 226 to determine for each stream whether the stream is usable or available, and may be derived from signaling passed as a part of the video signal, signaling passed on a separate control circuit, or from measurements of parameters of the video signal such as luminance, synchronization rates, or other appropriate methods known in the art.

Audio digitization and stream management subsystem 220 performs a function analogous to that of video digitization and stream management subsystem 218, but for audio signals. Audio digitization and stream management subsystem 220 receives items of media content (in this case, audio content) from audio content sources such as 126a and 126b via links 128a and 128b, respectively. Audio content sources 126a and 126b are depicted as microphones, but could be any source of audio content with which video digitization and stream management subsystem 218 is compatible. For example, audio sources 126a, 126b could be conventional microphones, microphones located in cars or driver helmets, audio signals from radio receivers, audio signals from broadcast media, streaming audio, or the like, and may be in conventional analog, digital audio, or other suitable formats. Moreover, although two content sources are shown, any number of audio content sources could be used, subject to the processing capacity of EAS 110. Audio content originating in mobile sources, such as in-car microphones, may be transported to audio digitization and stream management subsystem 220 via an on-site wireless network 210 or via a point-to-point wireless links such as 214 and 216.

Audio digitization and stream management subsystem 220 digitizes and encodes the audio content, as required, into an appropriate stream format which can be accepted by MGW 148 (FIG. 1). Audio digitization and stream management subsystem 220 may be implemented using general purpose computers, with commercially available "sound" cards, and programmed in any suitable computer programming language. Audio digitization and stream management subsystem 220 furnishes the digitized and encoded audio streams to control and data management subsystem 224 over audio stream pathways 248 for further processing. Some audio signals may arrive already digitized and/or encoded, in which case audio digitization and stream management subsystem 220 may either transcode the digitized audio in to a different format, or, if the signal is already supplied in a format usable by MGW 148, it may furnish the signal unchanged to control and data management subsystem 224.

Audio digitization and stream management subsystem 220 also furnishes information about the state of each audio stream to event/update detection subsystem 226 via audio stream state information link 250. This stream state information allows event/update detection subsystem 226 to determine for each stream whether the stream is usable or available, and may be derived from signaling passed as a part of the audio signal, signaling passed on a separate control circuit, or from measurements of parameters of the audio signal such as amplitude, presence of uncorrelated noise, or other appropriate methods known in the art.

Scoring/position/statistics database 228 receives scoring/position information from a score/position content source 130 via score/position signal path 132. Examples of scoring/position content may include the ordinal position of cars, the location of cars, the speed of the cars, fuel supply, lap number, and other information of interest to spectators. Scoring/position/statistics database 228 may also receive statistical information from an external statistics database 134 via statistics database link 136. Examples of statistics content may include aggregated information regarding rankings, standings, or prior performance of drivers, cars, teams, the track, the race series, the race organization, and the like. Scoring/position/statistics database 228 maintains a copy of scoring, position, and statistical information received from external sources in a conveniently retrievable form so that content may, from time to time, be transmitted to subscribers. Scoring, position, and statistical content are furnished to control and data management subsystem 224 via path 252, and may be pushed by scoring/position/statistics database 228 or may be requested by control and data management subsystem 224. Scoring/position/statistics database 228 provides information regarding the state of information under its control to event/update detection subsystem 226 via state information link 254. The state information generally indicates that new content has arrived or that existing content has changed.

Event/update detection subsystem 226 analyzes state information from video digitization and stream management subsystem 218, audio digitization and stream management subsystem 220, and scoring/position/statistics database 228. When event/update detection subsystem 226 determines that a state change affects subscription content, it sends an alert via event/update signal link 256 to control and data management subsystem 224.

Control and data management subsystem 224 provides overall control of EAS 110. In addition, control and data management subsystem 224 manages the delivery of requested content to subscriber terminals such as 120. When a spectator event begins, control and data management subsystem 224 interrogates the EAS subscriber database 138 to prepare a list of event service subscribers and their subscription preferences, including the priorities they have assigned to each content item or the priorities assigned by default. Control and data management subsystem 224 also tracks the availability of each item of content that can be requested by subscribers for the event, and interrogates MSC 116 (FIG. 1) or an associated home location register (HLR) (not shown) to determine which subscribers are actually present on wireless network 170.

At the beginning of the event, the control and data management subsystem 224 reconciles the subscription preferences and priorities for each subscriber against the content items currently available to determine an appropriate set of content items to deliver to that particular subscriber. As an example, a subscriber may wish to view video and hear audio from the in-car camera and microphone of car 21 whenever those items are available. When these video and audio sources are not available, the subscriber may wish to view a text display of vital information (speed, position, fuel, laps-to-go, etc.) for that car. Other subscribers almost certainly will have different preferences.

From time to time during the event, event/update detection subsystem 226 will detect a change in the state of a content item, and will alert control and data management subsystem 224. For example, a video or audio stream may become newly available, or newly unavailable. For another example, a driver may have passed another driver, and thus, the ordinal positions of both drivers in the race will have changed. The control and data management subsystem 224 will determine which subscribers are affected by the change in state. For each such subscriber, the control and data management subsystem 224 will again reconcile their subscription preferences and priorities against the content items currently available after the change to determine a new set of content items to deliver to that particular subscriber. Thus, the control and data management subsystem 224 delivers to each subscriber a set of content items that optimally reflects the subscription preferences and priorities the subscriber has established.

In addition to passing along content essentially as received, control and data management subsystem 224 may further process content to produce valuable derivative content items. For example, control and data management subsystem 224 could use data received regarding the position and speed of each car to produce a graphical image depicting a schematic view of the track with the positions of certain cars of interest marked thereon. This content may be delivered to wireless subscriber terminal 120 as an occasionally updated still image, or as a video stream.

Control and data management subsystem 224 may establish separate connections to the wireless subscriber terminal 120 for each type of content or media to be delivered, and may establish multiple connections for the same type of content or media. For example, control and data management subsystem 224 may establish a first connection to deliver a video stream acquired from a first source, a second connection to deliver an audio stream acquired from a second source, and a third connection to deliver text data acquired from a third source, along with instructions specifying the arrangement of the display. Thus, EAS 110 can deliver simultaneously multiple streams or transmissions of content to a wireless subscriber terminal 120. Each stream may be acquired from disparate or similar sources, and each stream may be of disparate or similar media or content types. The term "simultaneously" is used here to mean both actual simultaneity and situations where delivery of multiple streams of content is so interleaved as to appear to the subscriber to be simultaneous.

Although various technologies could be used to implement wireless network 170, market forces currently favor networks based on GPRS, 3GPP, or 3GPP2 standards, which include an MGCF 144. Where such networks are used to implement wireless network 170, control and data management subsystem 224 requests a bearer path connection to carry an appropriate media stream to wireless subscriber terminal 120 by sending to MGCF 144 an "Add" command as specified in ITU-T Recommendation H.248.1, identifying the wireless subscriber terminal 120 by its mobile identification number (MIN) or international mobile subscriber identity (IMSI). Once the bearer path is established, the control and data management subsystem 224 presents content items to the MGW 148 for delivery to subscriber terminal 120 through the wireless network 170. The content items may be in the form of individual messages, continuous streams, or some other format appropriate for the type of media to be delivered. The "Add" command preferably incorporates a MediaDescriptor field which describes each media stream, thereby allowing the MGCF and other components of wireless network 170 to allocate channels, bandwidth or other resources necessary to transport the media streams. MSC 116 includes an MGW 180 which may serve as a counterpart for content items delivered through MGW 148. The MGCF function of wireless network 170 may be performed by MSC 116. If wireless network 170 is implemented using a technology which does not employ a Media Gateway Control Function, control and data management subsystem 224 preferably requests a bearer path for the desired content from an appropriate control element within the network.

Responsive to the "Add" command, MGCF 144 sets up a bearer path connection through MGW 148 and MGW 180. That connection connects data from EAS 110, via base station 118, to wireless subscriber terminal 120. MSC 116 may interrogate MSC subscriber database 156 to determine whether the subscriber's wireless network service subscription (as opposed to any applications subscriptions) permits delivery of the requested content. If the subscription does not permit the delivery of the requested content, the MSC 116 may direct the MGCF 144 to reject the bearer path connection.

Control and data management subsystem 224 preferably comprises a stream replication facility 240 and a data replication facility 242. Control and data management subsystem 224 preferably maintains a list of which subscribers are to receive each content item, and as content is received, the appropriate replication facility directs a copy of the content to each subscriber. As an alternative, if IP network 112 and wireless network 170 support multicast technology, that feature can be used, eliminating the need to replicate content in the control and data management subsystem 224. When multicast technology is supported, packets directed to a multicast group can be replicated by routing elements distributed throughout the network, instead of replicating packets at the source.

EAS 110 is also preferably coupled to an EAS subscriber database 138 via an appropriate data link 140. The EAS subscriber database 138 may store, for example, the identity of subscribers to the event-related multimedia delivery service, along with particular information identifying the particular events for which the subscription is active, and a variety of user-specific feature choices and parameters relating thereto. By way of example, but not limitation, the EAS subscriber database 138 may preferably store for a particular subscriber and subscribed-to event indicia defining which content items the subscriber wishes to receive (e.g., video from in-car cameras, graphics displaying the track outline with cars of interest superimposed thereon, a list of statistics of favorite drivers or teams, audio of driver-to-pit-crew communications, and the like), and the priority of each selected content item. The EAS subscriber database 138 may be implemented using any appropriate database system technology, and may be implemented using distributed network resources, using apparatus and methods known in the art.

As best seen in FIG. 2, event-related media delivery system 100 may further comprise a subscriber-accessible subscription management system 230 which is coupled to EAS subscriber database 138 via link 258. EAS subscriber database 138 may be populated by an operations support or provisioning system (not shown), which is generally accessible only by service-provider personnel, and by the subscription management system 230, which is preferably accessible by subscribers. Subscription management system 230 is preferably connected to IP network 112, including the public Internet, via external IP link 260. Subscription management system 230 provides a user interface to enable a subscriber to define a selection of the event-related content items the subscriber desires to receive, and to define the relative priority of those items. A subscriber may access the subscription management system 230 using a web browser from the public Internet, or using a browser or other application from the wireless subscriber terminal 120. Although EAS subscriber database 138 and subscription management system 230 are shown as discrete elements external to EAS 110, these items could be implemented as an integrated part of EAS 110. Available events and the event-related items of media content available for a particular event may be defined by the service provider using a provisioning system (not shown), which may update the EAS subscriber database 138 or the subscription management system 230 via connections to IP network 112.

In operation, the subscription management system 230 retrieves a list of spectator events and associated content items available to the subscriber, and displays these items for the subscriber's review and selection. The subscription management system 230 may also indicate the cost of subscribing to a particular event or to particular content items, and may permit the subscriber to select the relative priority of various content items. Depending on characteristics of the wireless subscriber terminal 120, including the display size and device performance, the subscriber may be permitted to request that multiple content items be delivered simultaneously to the wireless subscriber terminal 120.

Once the subscriber has indicated a set of content selections, the subscription management system 230 presents a summary of the selections, where appropriate indicates the cost of the selected content items, and solicits the subscriber's approval to commit the changes to EAS subscriber database 138. If the subscriber approves, the changes are committed. An exemplary embodiment of a method by which subscription management system 230 may receive content selections from a subscriber is discussed in connection with FIG. 7.

FIGS. 3-6 are diagrams depicting several examples of content which may be displayed on the subscriber terminal 120. These examples are presented to give the reader an idea of the types of content, and the arrangements thereof, that may be displayed. However, many other content items, and numerous other arrangements thereof, could also be used.

As best seen in FIG. 3, an exemplary arrangement 310 is depicted in which the display 166 is divided into an upper display 312 occupying approximately the top ⅔ of the area, and a lower display 314 occupying approximately the bottom ⅓ of the area. Presented in the upper display is a graphical image 316 containing a schematic representation of the racetrack 318 and the pit lanes 326. Markers 320, 322, and 324 identify the position on the track of three cars of interest. The graphical image may be delivered as a still image updated from time to time, or may be delivered as a continuously updated video stream. Presented in the lower display is text 328 showing information about a car of interest to the subscriber. This content may be updated at regular intervals or when one or more items change significantly.

As best seen in FIG. 4, an exemplary arrangement 410 is depicted in which the display 166 is used in its entirety to show a single video image 412. Two cars 414 and 416 are visible.

As best seen in FIG. 5, an exemplary arrangement 510 is depicted in which the display 166 is divided into an upper display 512 and a lower display 514 of about the same size. Presented in the upper display is a live video image 516 from an aerial camera showing the track 518. Presented in the lower display 514 is a live video image 520 from an in-car camera. Gauges 524 and the steering wheel 526 are visible inside the car. Another car 522 is visible, ahead, through the windshield.

As best seen in FIG. 6, an exemplary arrangement 610 is depicted in which the display 166 is used in its entirety to show a text screen 612 containing statistics for a driver of interest.

Figure 7:
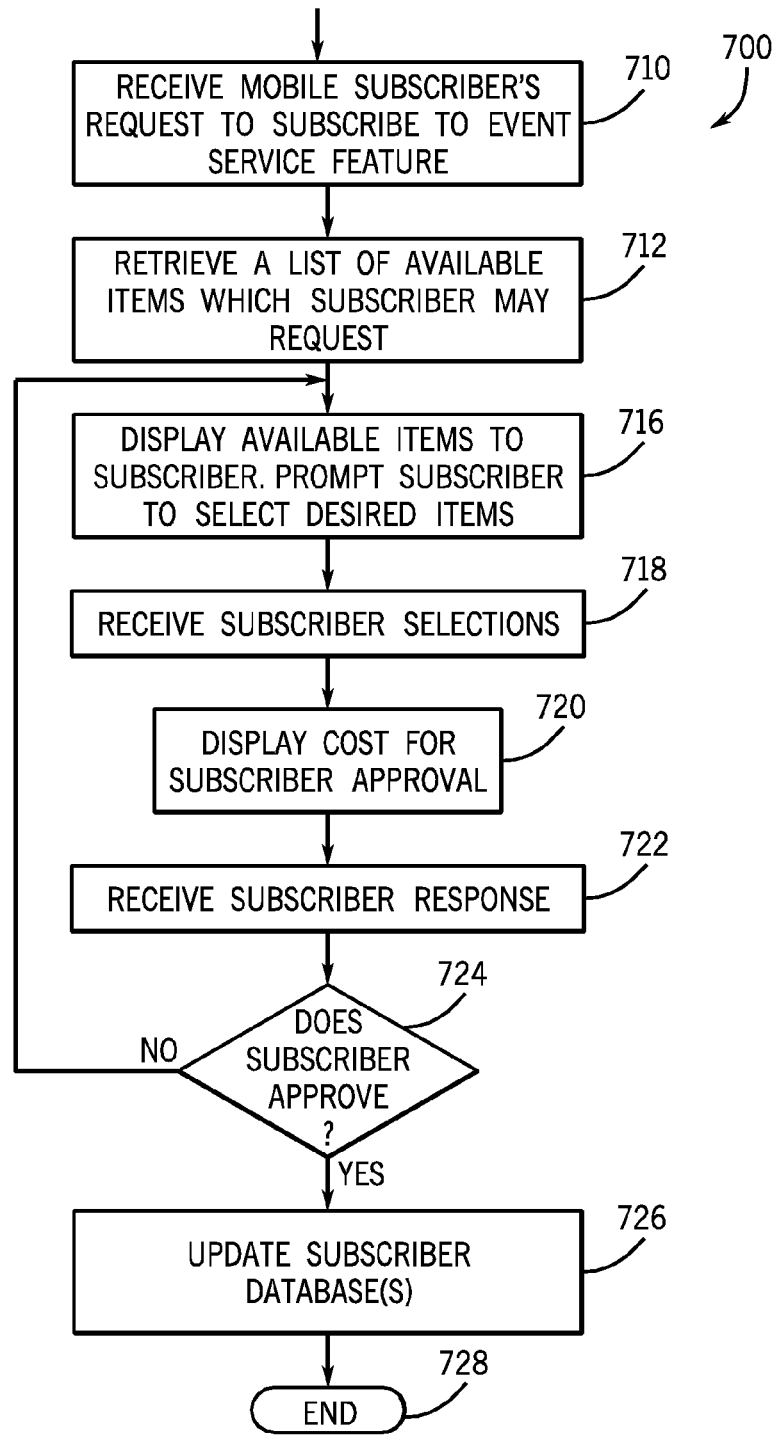
FIG. 7 is a flow diagram depicting an exemplary method 700 for use in conjunction with the system 100 of FIG. 1, prior to or during a spectator event, for receiving from a telecommunications subscriber selections regarding event-related content such subscriber desires be delivered to the subscriber terminal 120 by system 100.

In accord with a further aspect of the invention, FIG. 7 is a flow diagram depicting an exemplary method 700 for use in conjunction with the system 100 of FIG. 1, prior to or during a spectator event, for receiving from a telecommunications subscriber selections regarding event-related content such subscriber desires be delivered to the subscriber terminal 120. The steps of method 700 may be implemented by subscription management system 230, which may be separate from, or integrated as a part of EAS 110.

In step 710, the subscription management system 230 receives a subscriber's request to subscribe to the event-related content service feature. The request may be made from the wireless subscriber terminal 120 or from any web-browser-enabled device on the public Internet.

In step 712, the subscription management system 230 retrieves a list of available spectator events and associated content items which the subscriber may request. In step 716, the subscription management system 230 presents the available spectator events and associated content items to the subscriber and prompts the subscriber to review these items and select those desired. The list of content items may be adjusted based on the characteristics of the wireless subscriber terminal 120. For example, if the subscriber terminal is incapable of displaying certain content, the selections corresponding thereto may be omitted from those displayed to the subscriber. The subscriber may request to receive multiple content items simultaneously if the subscriber terminal is so capable.

In step 718, subscription management system 230 receives the subscriber selections. In step 720, subscription management system 230 displays a summary of subscriber selections with the cost of the selections and prompts the user for approval to commit the selections to the EAS subscriber database 138. In some cases, it may not be necessary to display the cost of the selection. For example, the event-related content service may be offered free-of-charge, or the subscriber may have purchased an unlimited-use package of services. In such instances, the subscription management system 230 may display just the summary of selected services.

In step 722, the subscription management system 230 receives the subscriber response. In step 724, the subscription management system 230 tests the response to determine whether the subscriber approved of the selections. If so, execution continues with step 726. If the subscriber did not approve of the selection, execution returns to step 716, where the available selections are again displayed. In step 726, subscription management system 230 commits the selections to the subscriber database 138. The method ends at step 728.

Figure 8:
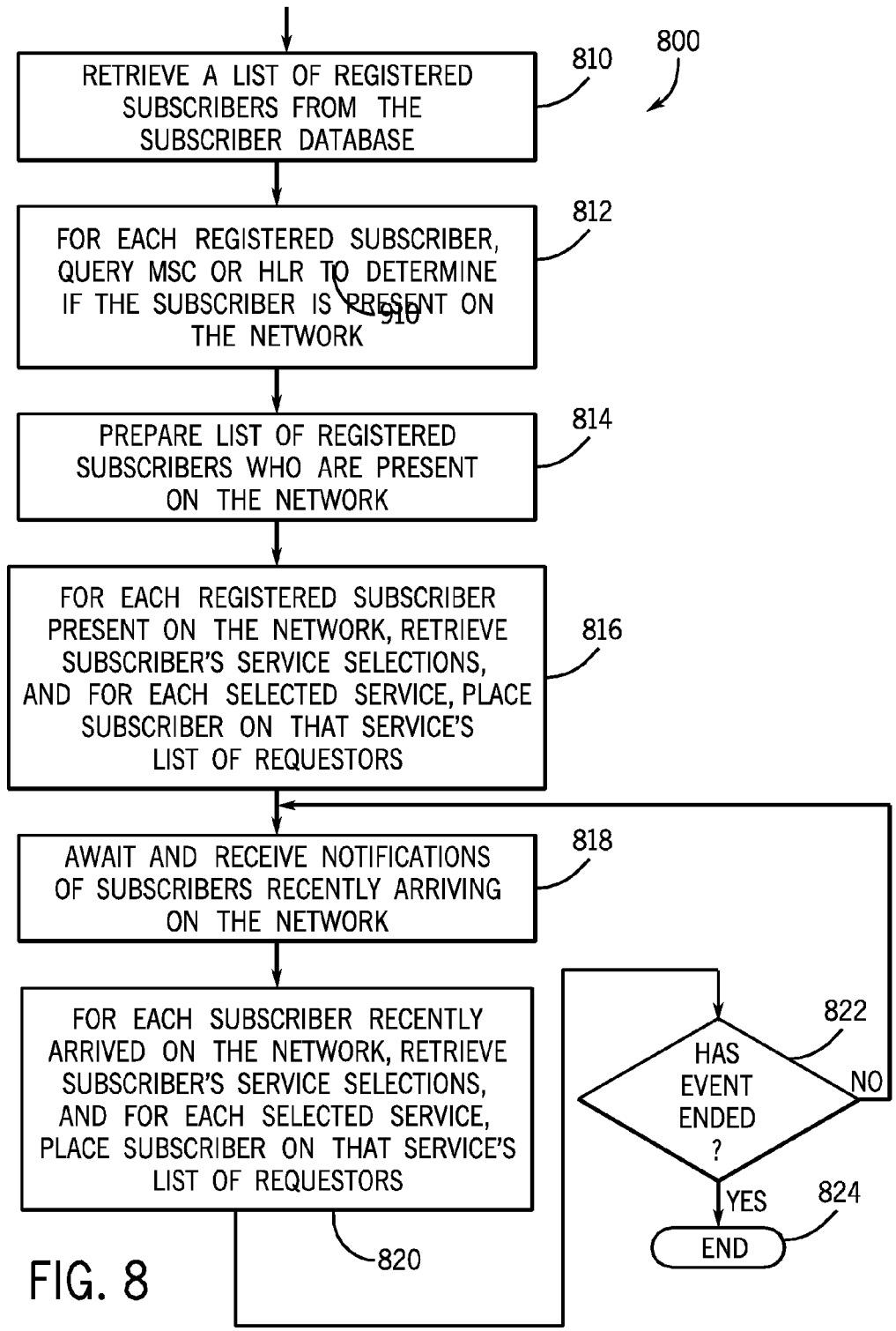
FIG. 8 is a flow diagram depicting an exemplary method 800 for use in conjunction with the system 100 of FIG. 1, around the time a spectator event is in progress, for managing the event-related content items which a telecommunications subscriber has requested be delivered to the subscriber terminal 120 by system 100.

In accord with a further aspect of the invention, FIG. 8 is a flow diagram depicting an exemplary method 800 for use with the system 100 of FIG. 1, around the time a spectator event is in progress, for managing the event-related content items which a telecommunications subscriber has requested be delivered to the subscriber terminal 120. The steps of method 800 may be implemented by EAS 110.

In step 810, EAS 110 retrieves from EAS subscriber database 138 a list of subscribers who have registered for the event-related content service. The term "registered" as used here refers to registration for the event-related content service, not to registration in a wireless network. In step 812, EAS 110 considers each registered subscriber in turn and interrogates MSC 116 or an associated home location register (HLR) (not shown) to determine whether the subscriber is present on the wireless network 170. If a subscriber is not present on the wireless network 170, there is no need to attempt to send event-related content because it cannot be delivered. The interrogation of the MSC 116 or HLR preferably includes a request, or is preferably construed by the MSC or HLR as a request, that the MSC or HLR notify EAS 110 of any subsequent changes in status of any of the subscribers about whom interrogation was made. Such changes in status include but are not limited to the arrival of the subscriber on the network, and the departure of the subscriber from the network. Such notifications by MSC 116 or an HLR allow the EAS to initiate a service which the subscriber earlier requested in response to the subscriber's arrival on the network, and to terminate a service in response to the subscriber's departure from the network. In step 814, EAS 110 assembles a list of registered subscribers present on the network.

For each available service or content item, the EAS 110 maintains a list of all of the subscribers who have requested that service or content item. In step 816, EAS 110 considers each registered subscriber present on the network, and retrieves that subscriber's content selections and priorities. Then, for each service or content item requested by that subscriber, the subscriber is added to the corresponding list of requesters.

In step 818, the EAS 110 awaits and receives notifications from the MSC 116 (or HLR) that subscribers of the event subscription service have recently arrived on the wireless network 170. In step 820, the EAS 110 performs functions similar to those of step 816. The EAS considers each registered subscriber newly arriving on the network, and retrieves that subscriber's content selections and priorities. Then, for each service or content item requested by that subscriber, the subscriber is added to the corresponding list of requesters. Thus, the EAS 110 continually maintains the list of requesters for each service or content item.

In step 822, EAS 110 tests to determine whether the spectator event has ended. If the event has not ended, execution returns to step 818, where the EAS 110 continues to monitor for newly arriving subscribers. If in step 822 it is determined that the event has ended, execution falls through to step 824, at which the method ends.

Figure 9:
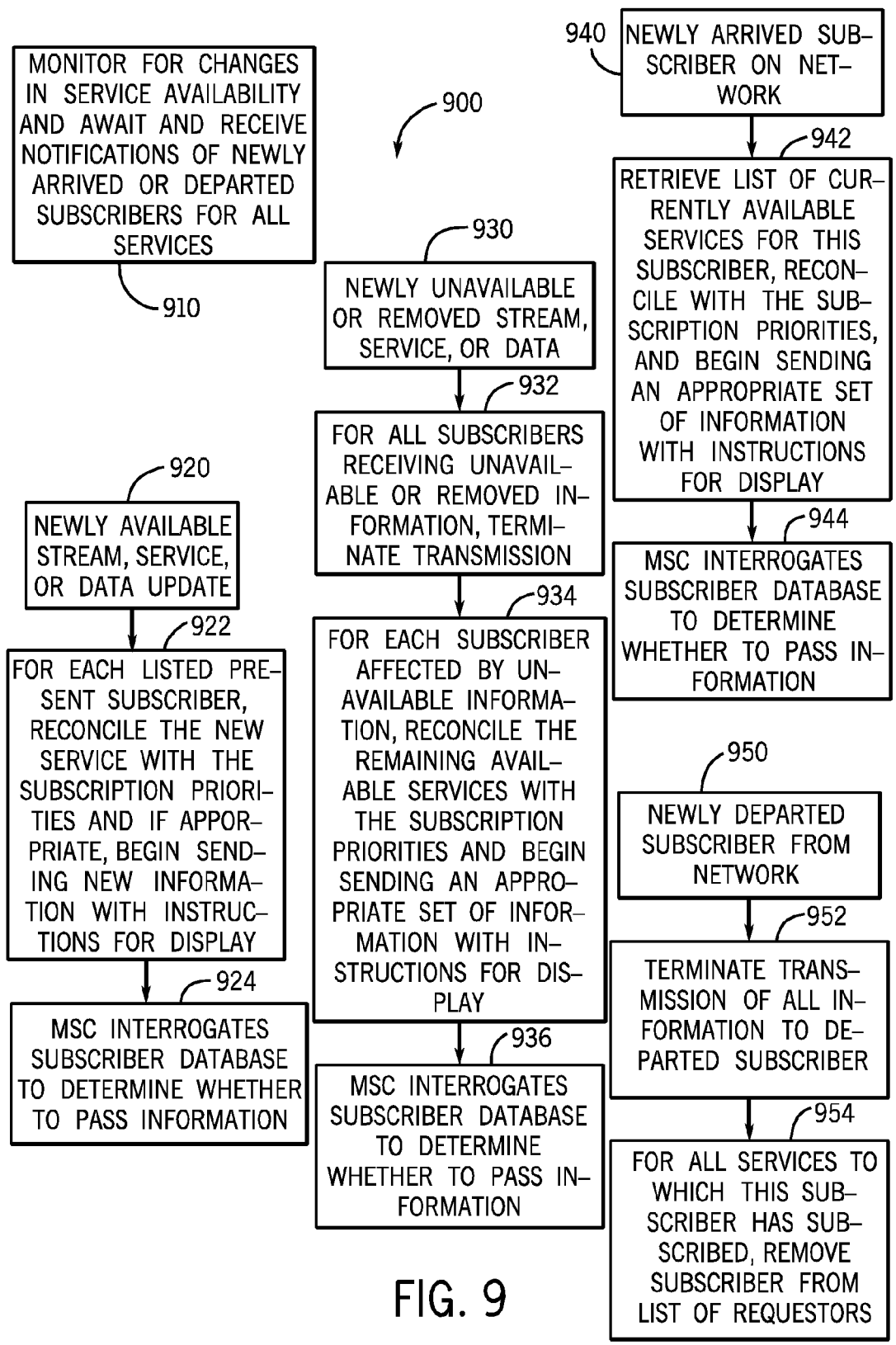
FIG. 9 is a flow diagram depicting an exemplary method 900 for use in conjunction with the system 100 of FIG. 1, around the time a spectator event is in progress, for delivering event-related content to the subscriber terminal 120 by system 100.

In accord with a further aspect of the invention, FIG. 9 is a flow diagram depicting an exemplary method 900 for use with system 100 of FIG. 1, around the time a spectator event is in progress, for delivering event-related content to the subscriber terminal 120. Unless otherwise mentioned, the steps of method 900 may be implemented by EAS 110.

In step 910, EAS 110 monitors for any changes in the availability of services or content items, and awaits and receives any notifications that registered subscribers have newly arrived on or departed from the wireless network 170. EAS 110 (and more specifically, control and data management subsystem 224) becomes aware of a change in the availability of a service or a content item via messages or signals from its event/update detection subsystem 226. EAS 110 becomes aware of the arrival or departure on wireless network 170 of registered event-content service subscribers by receiving notifications from MSC 116 or an associated home location register (HLR) (not shown).

Each of the vertical columns of steps below step 910 represent independently executable event-driven sub-methods, each corresponding to one of several possible cases: new content becomes available; content is removed or becomes unavailable; a registered subscriber newly arrives on wireless network 170; and a registered subscriber newly departs from wireless network 170. When one of these cases is detected, EAS 110 executes the corresponding sub-method. If EAS 110 is running a multitasking operating system, it may execute several similar or different instances of the sub-methods in parallel.

Step 920 is executed when new content, such as a newly available video or audio stream, service, or data update, is detected as available. In step 922, EAS 110 considers in turn the subscription information of each subscriber who has registered a request for the newly available content and who is present on wireless network 170. EAS 110 reconciles the newly available content with the subscription preferences and priorities of the subscriber. Based on the reconciliation, EAS 110 determines which available content would optimize the subscriber's preferences and priorities. If any new content is to be delivered to the wireless subscriber terminal 120, EAS 110 requests that MGCF 144 establish a bearer path through MGW 148, MGW 180, MSC 116, and base station 118 to wireless subscriber terminal 120 for such content and begins to deliver that content over the path. If delivery of any content is to cease, EAS 110 requests that MGCF 144 terminate the bearer path earlier established for that content. The EAS 110 continues to deliver any remaining content.

In step 924, the MSC 116 optionally interrogates MSC subscriber database 156 to determine whether the subscriber's wireless service subscription permits delivery of the content requested. MSC 116 may decline to deliver content if the subscriber's service subscription is not provisioned for this service. EAS 110 then continues to monitor for changes in step 910.

Step 930 is executed when content, such as a video or audio stream, service, or data update, is detected as unavailable or removed. In step 932, EAS 110 terminates transmission of the removed/unavailable content to all subscribers formerly receiving it. In step 934, EAS 110 considers in turn the subscription information of each subscriber affected by the removal or unavailability of the content and who is present on wireless network 170. EAS 110 reconciles the newly available content with the subscription preferences and priorities of the subscriber. Based on the reconciliation, EAS 110 determines which available content would optimize the subscriber's preferences and priorities. If any new content is to be delivered to the wireless subscriber terminal 120, EAS 110 requests that MGCF 144 establish a bearer path through MGW 148, MGW 180, MSC 116 and base station 118 to wireless subscriber terminal 120 for such content and begins to deliver that content over the path. If delivery of any content is to cease, EAS 110 requests that MGCF 144 terminate the bearer path earlier established for that content. The EAS 110 continues to deliver any remaining content.

In step 936, the MSC 116 optionally interrogates MSC subscriber database 156 to determine whether the subscriber's wireless service subscription permits delivery of the content requested. MSC 116 may decline to deliver content if the subscriber's service subscription is not provisioned for this service. EAS 110 then continues to monitor for changes in step 910.

Step 940 is executed when a registered event-related content subscriber has newly arrived on wireless network 170. In step 942, EAS 110 retrieves from EAS subscriber database 138 the list of services or content which this subscriber has requested, determines which of that content is currently available, and reconciles the available content with the subscription preferences and priorities of the subscriber. Based on the reconciliation, EAS 110 determines which available content would optimize the subscriber's preferences and priorities. If any new content is to be delivered to the wireless subscriber terminal 120, EAS 110 requests that MGCF 144 establish a bearer path through MGW 148, MSC 116 and base station 118 to wireless subscriber terminal 120 for such content and begins to deliver that content over the path.

In step 944, the MSC 116 optionally interrogates MSC subscriber database 156 to determine whether the subscriber's wireless service subscription permits delivery of the content requested. MSC 116 may decline to deliver content if the subscriber's service subscription is not provisioned for this service. MSC 116 may make appropriate billing and usage records in MSC subscriber database 156. EAS 110 then continues to monitor for changes in step 910.

Step 950 is executed when a registered subscriber departs from wireless network 170. In step 952, EAS 110 ceases delivery of all content to the departed subscriber. In addition, EAS 110 sends requests to MGCF 144 to terminate all active connections to wireless subscriber terminal 120. In step 954, EAS 110 retrieves from EAS subscriber database 138 the list of services or content item which this subscriber has requested, and for each service or content item, removes the subscriber from the list of requesters. EAS 110 then continues to monitor for changes in step 910.

The steps or operations described herein are just for example. There may be many variations to these steps or operations without departing from the spirit of the invention. For instance, the steps may be performed in a differing order, or steps may be added, deleted, or modified.

Thus, there has been described an event-related multimedia content delivery system comprising an event application server, a wireless network coupled to the event application server and a wireless subscriber terminal that interacts with the network. The event application server acquires, converts, and manages content related to a spectator event. The event application server (or its adjunct) also manages preferences and priorities established by subscribers for event-related content. When such content is available, the event application server reconciles available content with subscriber preferences and priorities to determine an optimal set of content to be delivered to the subscriber terminal, and requests that the wireless network establish a connection to the subscriber terminal for such content. Multiple streams of content, of various types of media, may be delivered simultaneously to the subscriber terminal. In contrast to broadcast media services, the subscriber advantageously may receive a set of content closely tailored to match the subscriber's preferences and priorities. In addition, because the subscriber is likely to carry the subscriber terminal anyway, using the subscriber terminal to receive multimedia content is more convenient than using conventional broadcast media receivers.

Although this invention has been described as it could be applied to an automobile race event, one of skill in the art will appreciate that with no or small modifications, the invention may similarly be applied to other sporting events, such as the Olympic games, and to other activities, such as the launch of a space vehicle, political conventions and other large meetings, festivals of music, arts, or other entertainment, and the like. These are merely examples of ways in which the invention may be applied; the invention is not limited to these examples, and could be applied to many other environments.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus comprising:

an event application server coupled to a wireless telecommunications network; said event application server being adapted to:

acquire event-related media content relating to a spectator event, the media content having a plurality of media content items;

receive from at least one subscriber terminal of said wireless telecommunications network user selected preferences defining a user selection of event-related media content items of said media content relating to the spectator event;

determine when currently available media content items, of the event-related media content related to the spectator event, include media content items that respectively match the user selected preferences of the at least one subscriber terminal;

determine when the currently available media content items, of the event-related media content related to the spectator event, do not include media content items that match all of the user selected preferences of the at least one subscriber terminal, a set of media content items, of the event-related media content related to the spectator event, that are closely tailored to the user selected preferences, but that do not match all of the media content items defined by the user selected preferences; and send the closely tailored set of media content items to the at least one subscriber terminal.

2. The apparatus of claim 1 wherein said event application server comprises a subscription management system for receiving said preferences from said subscriber terminal.

3. The apparatus of claim 1 further comprising a subscription management system for receiving said preferences from said subscriber terminal.

4. The apparatus of claim 1 wherein said event application server comprises at least one digitization subsystem for acquiring said media content.

5. The apparatus of claim 1 wherein said event application server comprises a first digitization subsystem for acquiring event-related content of a first media type, and a second digitization subsystem for acquiring event-related content of a second media type different from said first type, and wherein said event application server is adapted to deliver simultaneously multiple streams of event-related content of the first and second media types through said wireless telecommunications network to said subscriber terminal, and wherein said event application server is adapted to deliver instructions that specify an arrangement of the event-related content of the first and second media types on a display of said subscriber terminal.

6. An apparatus comprising:
at least one acquisition subsystem for acquiring and digitizing items of event-related media content relating to a spectator event;
a subscription subsystem for storing and maintaining user selected preference information received from a respective subscriber terminal the user selected preference information defining a selection of items of event-related media content which the subscriber would like to receive on a the respective subscriber terminal; and
a control system coupled to said at least one acquisition subsystem and said subscription subsystem, said control system being responsive to;
determine when currently available media content items, of the event-related media content related to the spectator event, include media content items that respectively match the user selected preferences of the subscriber terminal;
determine when the currently available media content items, of the event-related media content related to the spectator event, do not include media content items that match all of the user selected preferences of the subscriber terminal, a set of media content items, of the event-related media content related to the spectator event, that are closely tailored to the user selected preferences, but that do not match all of the media content items defined by the user selected preferences; and
send the closely tailored set of media content items to the subscriber terminal.

7. The apparatus of claim 6, wherein said at least one acquisition system is adapted to acquire and digitize items of media content of a first media type; and further comprising another acquisition system adapted to acquire and digitize items of media content of a second media type different from said first media type, and wherein said apparatus is adapted to deliver simultaneously multiple streams of event-related content of the first and second media types through said wireless telecommunications network to said subscriber terminal, and wherein said apparatus is adapted to deliver instructions that specify an arrangement of the event-related content of the first and second media types on a display of said subscriber terminal.

8. The apparatus of claim 7 wherein said first media type is video and said second media type is audio.

9. The apparatus of claim 7 wherein said first media type is video and said second media type is text.

10. The apparatus of claim 7 wherein said first media type is video and said second media type is a still graphic Image.

11. The apparatus of claim 7 wherein said first media type is audio and said second media type is text.

12. A method comprising the steps of:
receiving, on a wireless network, from at least one subscriber terminal, user selected preference information defining items of event-related media content relating to a spectator event which items the subscriber would like to receive on a the subscriber terminal;
acquiring items of event-relate media content relating to a the spectator event; determining when currently available media content items, of the event-related media content related to the spectator event, include media content items that respectively match the user selected preference information of the subscriber;
determining when the currently available media content items, of the event-related media content related to the spectator event, do not include media content items that match all of the user selected preference information, a set of media content items, of the event-related media content related to the spectator event, that are closely tailored to the user selected preference information, but that do not match all of the media content items defined by the user selected preference information; and
sending the closely tailored set of media content items to the subscriber terminal.

13. The method of claim 12 wherein:
said acquiring step further comprises the step of acquiring items of media content of at least two different media types; and
the method further comprises the step of presenting to the wireless network said acquired items of media content of at least two different media types, at the same time, for delivery to said subscriber terminal.

14. The method of claim 13 wherein:
said preferences information includes relative priorities assigned by the subscriber as to the desirability of certain items of media content.

15. The method of claim 13, wherein said presenting step further comprises the step of presenting to the wireless network said acquired items of media content of video and text types, at the same time, for delivery to said subscriber terminal.

16. The method of claim 13, wherein said presenting step further comprises the step of presenting to the wireless network said acquired items of media content of audio and text types, at the same time, for delivery to said subscriber terminal.

* * * * *